United States Patent
Kurai et al.

(10) Patent No.: US 8,346,797 B2
(45) Date of Patent: Jan. 1, 2013

(54) SEARCH DEVICE AND INFORMATION PROVIDING SYSTEM

(75) Inventors: Osamu Kurai, Tokyo (JP); Kentaro Okada, Tokyo (JP); Satoru Tanaka, Tokyo (JP); Masaharu Ejiri, Tokyo (JP); Minoru Kushida, Tokyo (JP); Nobuyuki Imamura, Tokyo (JP); Ayako Kanno, Tokyo (JP); Akihito Kiuchi, Tokyo (JP)

(73) Assignee: Vodafone Group PLC, Newbury, Berkshire (GB)

( * ) Notice: Subject to any disclaimer, the term of this patent is extended or adjusted under 35 U.S.C. 154(b) by 0 days.

(21) Appl. No.: 10/551,544

(22) PCT Filed: Jan. 28, 2005

(86) PCT No.: PCT/JP2005/001278
§ 371 (c)(1),
(2), (4) Date: Feb. 21, 2006

(87) PCT Pub. No.: WO2005/073878
PCT Pub. Date: Aug. 11, 2005

(65) Prior Publication Data
US 2007/0073648 A1    Mar. 29, 2007

(30) Foreign Application Priority Data
Jan. 30, 2004    (JP) ................................. 2004-024922

(51) Int. Cl.
*G06F 7/00* (2006.01)
*G06F 17/30* (2006.01)
*G06F 13/14* (2006.01)
(52) U.S. Cl. .......................... 707/770; 707/758; 707/769
(58) Field of Classification Search ................ 707/1–10, 707/100–104.1, 999.001–4, 999.01, 999.1, 707/1/1, 706–709, 209, 608, 694, 770, 823; 178/18; 235/375; 353/25; 704/1; 706/45–61; 715/255–272; 717/136–161; 709/203–206, 709/217, 224, 226, 246; 455/412.1, 412.2, 455/413–414; 705/26, 7.13, 14.1; 718/104; 710/1

See application file for complete search history.

(56) References Cited

U.S. PATENT DOCUMENTS

| | | | |
|---|---|---|---|
| 6,334,126 B1 * | 12/2001 | Nagatomo et al. ..................... | 1/1 |
| 6,401,085 B1 * | 6/2002 | Gershman et al. ................ | 707/4 |
| 6,983,310 B2 * | 1/2006 | Rouse et al. .................. | 709/206 |

(Continued)

FOREIGN PATENT DOCUMENTS

JP    2002-140257 A    5/2002

(Continued)

*Primary Examiner* — Greta Robinson
*Assistant Examiner* — Cecile Vo
(74) *Attorney, Agent, or Firm* — Muirhead and Saturnelli, LLC

(57) ABSTRACT

A search device and an information providing system are structured, to lessen a user's operation load, such that a crawling portion executes a crawling while sequentially changing an expansion header indicating a voice display capacity in an HTTP request into a voice display capacity of a typical model within each of model groups, and registers the obtained result in a search index in correspondence to the model name within the model group, a search service providing portion executes a search from the search index in correspondence to a search condition like a key word from a cellular phone terminal unit and the model name in the HTTP request, and a response portion generates a search result in correspondence to a template, and sends to a Web browser of the cellular phone terminal unit via an HTTP server.

19 Claims, 14 Drawing Sheets

U.S. PATENT DOCUMENTS

| | | | |
|---|---|---|---|
| 7,299,035 B2 * | 11/2007 | Morota et al. | 455/418 |
| 7,310,514 B2 * | 12/2007 | Shinohara | 455/412.2 |
| 7,310,628 B2 * | 12/2007 | Sugimoto et al. | 1/1 |
| 2003/0177113 A1 * | 9/2003 | Wakita | 707/3 |
| 2003/0217099 A1 * | 11/2003 | Bobde et al. | 709/202 |
| 2003/0224765 A1 * | 12/2003 | Udagawa et al. | 455/414.1 |

FOREIGN PATENT DOCUMENTS

| | | |
|---|---|---|
| JP | 2003-044397 A | 2/2003 |

* cited by examiner

Melody signaling incoming call  2 2 A A

| Model group | Representative | Model name list | | | |
|---|---|---|---|---|---|
| 1 | V-DN02 | V-DN02 | V-P02 | | |
| 2 | V-SH02 | V-SH02 | V-SA02 | | |
| . | . | . | . | | |
| 5 | V-D05 | V-D05 | . | | |
| . | . | . | . | | |
| 7 | V-SH53 | V-SH53 | V-SH601 | . | |

Image  2 2 A B

| Model group | Representative | Model name list | | | |
|---|---|---|---|---|---|
| 1 | V-DN02 | V-DN02 | V-P02 | V-SH02 | V-SA02 |
| 2 | V-SH53 | V-SH53 | V-SH601 | . | |

V Application  2 2 A C

| Model group | Representative | Model name list | | | |
|---|---|---|---|---|---|
| 1 | V-DN02 | V-DN02 | V-P02 | V-SH02 | V-SA02 |
| 2 | | | | | |
| 3 | V-SH53 | V-SH53 | V-SH601 | . | |

FIG. 6

| Terminal Attribute ID | Number of simultaneous sound production | Corresponding format |
|---|---|---|
| 1 | 4 | SMD |
| 2 | 16 | SMD/SMAF |
| 3 | 32 | SMD/SMAF |
| . | . | . |
| 5 | . | . |
| . | . | . |
| 7 | 64 | SMD/SMAF |
| . | . | . |

FIG. 7

| Terminal Attribute ID | Number of simultaneous color development | Maximum number of pixel |
|---|---|---|
| 1 | 4096 | 120x160 |
| 2 | 65536 | 240x320 |
| . | . | . |
| . | . | . |

Collection pattern name / Applied collection start URI / Agent used for collection

```
PATTERN1 http://www.aaa.co.jp/  http://www.bbb.co.jp/ AGENT1

PATTERN2 http://www.ccc.co.jp/  http://www.ddd.co.jp/ AGENT2, AGENT3

.........  ................

PATTERNx http://www.meloJAM.com/  AGENT1, AGENT2, AGENT3, AGENT7

.........  ................

DEFAULT AGENT1
```

FIG. 9

Agent name / Browser version / Expansion header (per model group) / Upper limit value of page

```
AGENT1 vodafone / 2.0 / V-DN02 x-color: C4096 x-sound: 1 / 6KB

AGENT2 vodafone / 2.0 / V-SH02 x-color: C4096 x-sound: 2 / 6KB

AGENT3 vodafone / 2.5 / V-D05  x-color: C4096 x-sound: 5 / 12KB

AGENT7 vodafone / 3.0 / V-SH53 x-color: C65536 x-sound: 7 / 12KB
```

| Key word | Contents name | Kind of contents | Model group | Model name list | | | Address |
|---|---|---|---|---|---|---|---|
| AAA | Melody JAM | Melody | 1 | V-DN02 | V-P02 | | http://meloJAM.com/AAA.smd |
| AAA | Melody JAM | Melody | 2 | V-SH02 | V-SA02 | | http://meloJAM.com/AAA.smaf |
| AAA | Melody JAM | · | · | · | · | · | · |
| AAA | Melody JAM | Melody | 7 | V-SH53 | V-SH601 | | http://meloJAM.com/AAA.smaf |
| BA | RETURNS | Image ? | 1 | V-DN02 | V-P02 | V-SH02 V-SA02 | http://returns.com/~ |
| BA | RETURNS | Image ? | 2 | V-SH53 | V-SH601 | | http://returns.com/~ |
| CA | Nezmy-J | Image ? | 1 | V-DN02 | V-P02 | V-SH02 V-SA02 | http://nezumy.co.jp/~ |
| CA | Nezmy-J | Image ? | 2 | V-SH53 | V-SH601 | | http://nezumy.co.jp/~ |
| DA | · | V Application | · | · | | | · |
| | · | · | · | · | | | · |

```
<HTML>
<HEAD>
<TITLE>Template 2G</TITLE>
</HEAD>
<BODY TEXT=#000000 LINK=#0000FF BGCOLOR=#FFFFFF>
<CENTER>Search result <BR>
$$TITLE
 About     <BR>
$$n
 Hits items        <BR></CENTER>
$$if exist
$$from(max:5)
<A href="
$$link_m
"><FONT color="#FF00FF">AAA</FONT></A><BR>
<BR>
$$to
$$endif
$$if exist
<A href="
$$prev
">prev</A><BR>
$$endif
$$if exist
<A href="
$$next
">next</A><BR>
$$endif
</BODY>
</HTML>
```

FIG. 15

| Variable | |
|---|---|
| $$TITLE | Key word |
| $$n | Number of hits |
| $$link_m | Address |
| $$etc | Accessory information |
| $$prev | Address of previous search result |
| $$next | Address of next search result |

FIG. 16

| Command | |
|---|---|
| $$from(max:x) $$to | Repeat portion to $$ x times maximum |
| $$if exist $$endif | If exist, execute portion to $$ endif |

```
<HTML>
<HEAD>
<TITLE>Template 2.5G</TITLE>
</HEAD>
<BODY TEXT=#000000 LINK=#0000FF BGCOLOR=#FFFFFF>
<CENTER> Search result <BR>
$$TITLE
About        <BR>
$$n
Hits items        <BR></CENTER>
$$if exist
$$ftom(max:10)
<A href="
$$link_m
"><FONT color="#FF00FF">AAA</FONT></A><BR>
<BR>
$$to
$$endif
$$if exist
<A href="
$$prev
">prev</A><BR>
$$endif
$$if exist
<A href="
$$next
">next</A><BR>
$$endif
</BODY>
</HTML>
```

```
<HTML>
<HEAD>
<TITLE>Template 3G</TITLE>
</HEAD>
<BODY TEXT=#000000 LINK=#0000FF BGCOLOR=#FFFFFF>
<CENTER> Search result <BR>
$$TITLE
    About       <BR>
$$n
    Hits items       <BR></CENTER>
$$if exist
$$ftom(max:10)
<A href="
$$link_m
">
$$etc
<FONT color="#FF00FF">AAA</FONT></A><BR>
<BR>
$$to
$$endif
$$if exist
<A href="
$$prev
">prev</A><BR>
$$endif
$$if exist
<A href="
$$next
">next</A><BR>
$$endif
</BODY>
</HTML>
```

FIG. 19

```
<HTML>
<HEAD>
<TITLE>Template 2G</TITLE>
</HEAD>
<BODY TEXT=#000000 LINK=#0000FF BGCOLOR=#FFFFFF>
<CENTER>Search result <BR>
    About AAA    <BR>
    Hits one item      <BR></CENTER>
<A href="http://meloJAM.com/AAA.smaf"><FONT color="#FF00FF">AAA</FONT></A><BR>
<BR>
</BODY>
</HTML>
```

| Key word | Contents name | Kind of contents | Model group | Model name list | Address |
|---|---|---|---|---|---|
| AAA | Melody JAM | Melody | 1 | V-DN02  V-P02 | http://meloJAM.com/cgi/abc.cgi? |
| AAA | Melody JAM | Melody | 2 | V-SH02  V-SA02 | http://meloJAM.com/cgi/abc.cgi? |
| AAA | Melody JAM | · | · | · | · |
| AAA | Melody JAM | Melody | 7 | V-SH53  V-SH601 | http://meloJAM.com/cgi/abc.cgi? |
| BA | RETURNS | Image ? | 1 | V-DN02  V-P02  V-SH02  V-SA02 | http://returns.com/cgi/def.cgi? |
| BA | RETURNS | Image ? | 2 | V-SH53  V-SH601 | http://returns.com/cgi/def.cgi? |
| CA | Nezmy-J | Image ? | 1 | V-DN02  V-P02  V-SH02  V-SA02 | http://nezumy.co.jp/bin/ghi.cgi? |
| CA | Nezmy-J | Image ? | 2 | V-SH53  V-SH801 | http://nezumy.co.jp/bin/ghi.cgi? |
| DA | · | V Application | · | · | · |
| · | · | · | · | · | · |

```
<HTML>
<HEAD>
<TITLE>Template 2G</TITLE>
</HEAD>
<BODY TEXT=#000000 LINK=#0000FF BGCOLOR=#FFFFFF>
<CENTER>Search result <BR>
About AAA    <BR>
Hits one item        <BR></CENTER>
<A href="http://meloJAM.com/cgi/abc.cgi?
keyword=AAA"><FONT color="#FF00FF">AAA</FONT></A><BR>
<BR>
</BODY>
</HTML>
```

Gobble down contents

SEARCH DEVICE AND INFORMATION PROVIDING SYSTEM

TECHNICAL FIELD

The present invention relates to a search device searching an address of contents or the like such as a melody signaling an incoming call, an image or the like in correspondence to a request from an information terminal unit such as a cellular phone terminal unit or the like, and an information providing system providing the contents.

BACKGROUND ART

There has been known a cellular phone terminal unit which gobbles down data (contents) such as a sound signaling an incoming call, a melody signaling the incoming call, an awaiting screen or the like at an incoming standby time from an information providing server unit such as an HTTP server or the like via a network, and can be customized in correspondence to a preference of a user (for example, refer to Japanese Unexamined Patent Publication No. 2000-76264 (pages 6-7, FIGS. 1 and 2)).

If the number of the available contents is increased, there is generated a necessity that the contents are classified per directory, for example, per category, per artist, per tune or the like and the data is selected in stages. However, since the display screen of the cellular phone terminal unit is largely restricted in size in comparison with a general-purpose information processing unit such as a personal computer or the like, and the information which can be displayed on one screen is limited, a number of operation until the target contents is found is increased.

Accordingly, there can be considered to use an information search service provided via a network such as an internet or the like for searching the data mentioned above. The information search service collects the addresses of the contents provided by the information providing server unit providing the contents in accordance with a crawling by a search robot, and registers them in a data base per key word of the contents.

If the key word is supplied from the terminal unit of the user, the server unit providing the search service abstracts the address of the corresponding contents to the key word from the data base, and provides as a result of search to the terminal unit (for example, refer to SEO JAPAN, "What is search engine?", 2003, [online], SEO JAPAN, [search on Jan. 9, 2004], internet <URL: http://www.seojapan.jp/search-engines/search-engine.html>).

DISCLOSURE OF THE INVENTION

Problem to be Solved by the Invention

Meanwhile, there is a case that a display capacity of the cellular phone terminal unit is different in correspondence to a cost of the unit, a design policy or the like, for example, a number of simultaneous sound of the melody signaling an incoming call is four in a certain terminal, and is sixteen in the other terminal.

In the information search service provided by the conventional network as mentioned above, the display capacity of the terminal unit is not considered. In the case that the information search service is employed as the search service toward the cellular phone terminal unit as it is, the address of the data of the melody signaling the incoming call corresponding to the key word is provided regardless of a matter that it can be reproduced by the cellular phone terminal unit offered with the search service. Accordingly, it is necessary for the user to check one by one whether or not the contents corresponding to the search result obtained by the search service mentioned above can be utilized by the cellular phone terminal unit of the user, and it has been thus desired to reduce a load of operation of the user.

The present invention is made by taking the problem mentioned above into consideration, and an object of the present invention is to provide a search device or the like which can provide a proper search result in correspondence to a capacity of a terminal unit and can contribute to reduce a load of operation of a user.

Means for Solving the Problem

In order to solve the problem mentioned above, in accordance with the present invention, there is provided a search device providing a search service about a data provided by a contents providing server capable of providing contents corresponding to an information showing a contents display capacity under an information request command, comprising:

a crawling means for searching an address of the contents by using the information showing the contents display capacity of a typical model in a model group per the model group set per the contents display capacity;

a search index holding the address of the contents obtained by the crawling means in correspondence to a model name of a terminal unit in the model group at a time of crawling; and a searching means for gobbling down the address of the contents in the search index in correspondence to the model name under the information request command from the terminal unit.

Further, in accordance with another aspect of the present invention, there is provided a search device providing a search service about a data provided by a contents providing server capable of providing contents corresponding to an information showing a contents display capacity under an information request command and a key word, comprising:

a crawling means for searching a predetermined address corresponding to the contents by using the information showing the contents display capacity of a typical model in a model group per the model group set per the contents display capacity;

a search index holding the predetermined address corresponding to the contents obtained by the crawling means in correspondence to a model name of a terminal unit in the model group at a time of crawling;

a searching means for gobbling down the predetermined address in the search index in correspondence to the key word and the model name under the information request command from the terminal unit; and a search result generating means for generating a search result including the predetermined address and the search result.

Effect of the Invention

In accordance with the present invention, the crawling means searches the address of the contents by using the information showing the contents display capacity of the typical model in the model group per the model group set per the contents display capacity, the address of the contents obtained by the crawling means is held in the search index in correspondence to the model name of the terminal unit in the model group at a time of crawling, and the searching means gobbles down the address of the contents in the search index in correspondence to the model name under the information request command from the terminal unit. Accordingly, it is possible to provide a proper search result in correspondence to the capacity of the terminal unit, it is possible to reduce a generation of a wasteful operation caused by the search result about the contents which can not be utilized by the terminal unit, and it is possible to contribute to reduce the operation load of the user.

Further, in accordance with another aspect of the present invention, the crawling means searches the predetermined address corresponding to the contents by using the information showing the contents display capacity of the typical model in the model group per the model group set per the contents display capacity, the predetermined address corresponding to the contents obtained by the crawling means is held in the search index in correspondence to the model name of the terminal unit in the model group at a time of crawling, the searching means gobbles down the predetermined address in the search index in correspondence to the key word and the model name under the information request command from the terminal unit, and the search result generating means generates the search result including the predetermined address and the search result. Accordingly, it is possible to contribute to reduce the operation load of the user, and it is possible to generate the search result which can provide the contents via the predetermined address.

BRIEF DESCRIPTION OF THE DRAWINGS

FIG. 5 is a view showing an example of a display capacity correspondence table held in a DB of the search server constructing the information providing system;

FIG. 6 is a view showing an example of the correspondence table held in the DB;

FIG. 7 is a view showing an example of the correspondence table held in the DB;

FIG. 8 is a view showing an example of a collection pattern held in the DB;

FIG. 9 is a view showing an example of an agent definition held in the DB;

FIG. 11 is a view showing an example of a contents table stored in the DB on the basis of the crawling operation;

FIG. 14 is a view showing an example of a template held in the DB;

FIG. 15 is a view showing an example of a variable in the template;

FIG. 16 is a view showing an example of a command in the template;

FIG. 17 is a view showing another example of the template;

FIG. 18 is a view showing another example of the template;

FIG. 19 is a view showing an example of a data of a search result generated by using the template;

FIG. 22 is a view showing an example of a contents table stored in the DB on the basis of a crawling operation in an information providing system in accordance with an embodiment 2 of the present invention;

DESCRIPTION OF REFERENCE NUMERALS

10 denotes an information providing server group, 110, 120 denote information storing portions, 120, 220 denote HTTP servers, 121 denotes a request analyzing portion, 122 denotes an index holding portion, 123 denotes a contents gobble-down portion, 124 denotes a response portion, 20 denotes a search server, 21 denotes a crawling portion, 22 DB, 22A denote display capacity correspondence tables, 22B denotes a collection pattern, 22C denotes a search index, 22D denotes a template, 23 denotes a search service providing portion, 50, 60 denote cellular phone terminal units, 52 MPU, 530 denote Web browsers, 53 denotes a memory, 53a denotes a holding portion of melody signaling incoming call, and 53b denotes an image data holding portion.

BEST MODE FOR CARRYING OUT THE INVENTION

The present invention can be applied, for example, to an information providing system which provides data (contents) such as a melody signaling an incoming call, an image or the like to plural types of cellular phone terminal units having different display capacities.

Embodiment 1

(Entire Structure)

Figure 1:
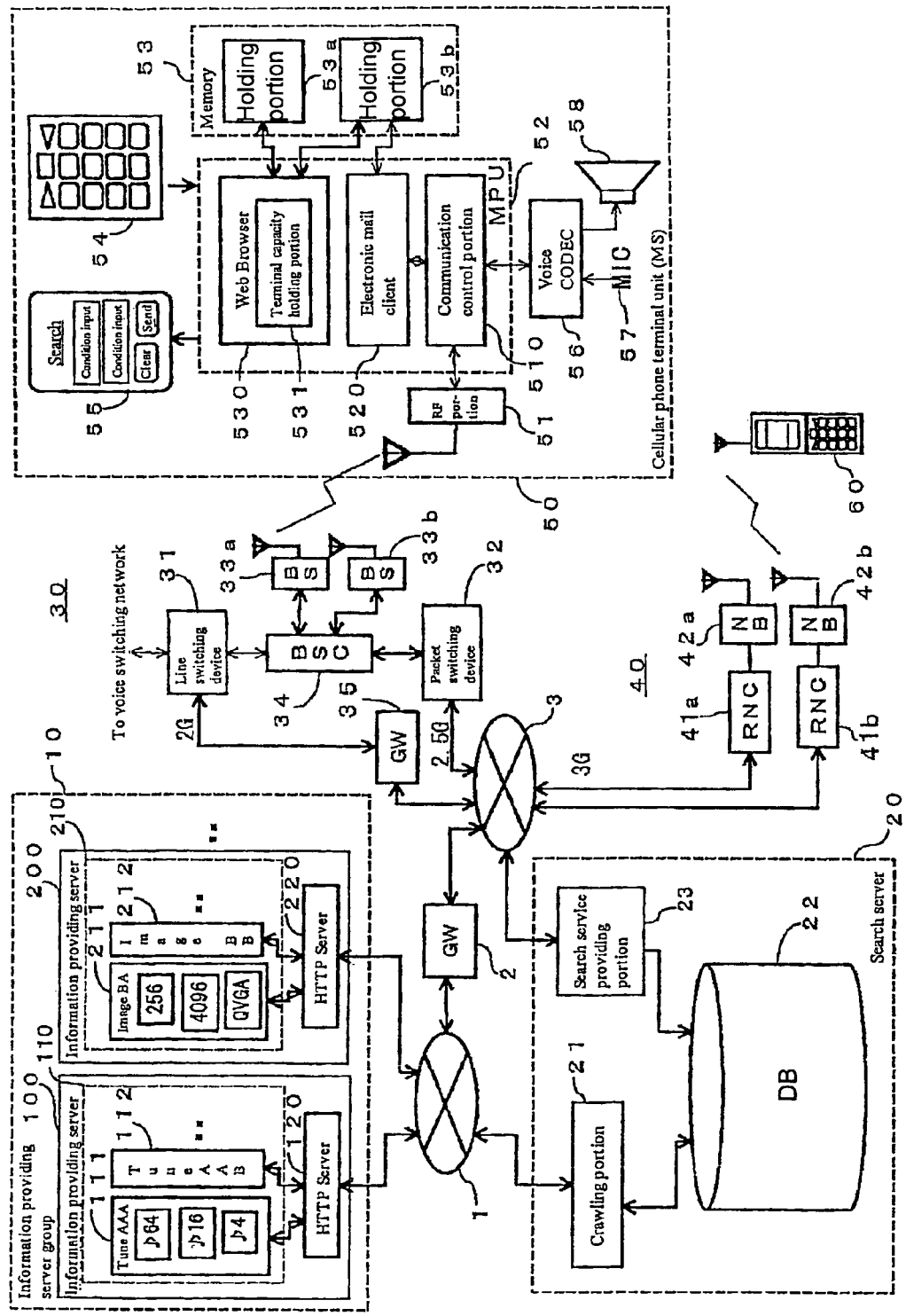
FIG. 1 is a block diagram showing a structure of an information providing system in accordance with an embodiment 1 of the present invention.

An information providing system in accordance with an embodiment of the present invention is provided with an information providing server group 10 providing contents such as a melody signaling an incoming call, an awaiting screen or the like via a network such as an internet or the like, a search server (a search device) 20 providing a search service relating to the contents provided by the information providing server group 10, a cellular phone terminal unit 50 and a cellular phone terminal unit 60 which utilize the search service provided by the search server 20, for example, as shown in FIG. 1.

The cellular phone terminal unit 50 can access to the information providing server group 10 and the search server 20 via a mobile communication network 30, for example, constituted by a personal digital cellular (PDC) type mobile communication network. Further, the cellular phone terminal unit 60 can access to the information providing server group 10 and the search server 20 via a mobile communication network 40, for example, constituted by a wideband-code division multiple access (W-CDMA) type mobile communication network.

(Structure of Information Providing Server Group)

The information providing server group 10 is structured, for example, by a plurality of information providing servers (contents providing servers) 100, 200, . . . . Each of the information servers 100 (200) is provided with an information storage portion 110 (210) storing the contents provided by the information providing server, and an HTTP server 120 (220) providing the contents stored in the information storage portion 110 (210) via a network 1.

The contents provided by the information providing servers 100, 200 are managed, for example, hierarchically, and the individual contents can be selected by selecting from the index in each of the hierarchies.

The information providing server 100 provides the contents, for example, a tune data of a melody signaling an incoming call. The information storage portion 110 is provided, for example, with tune data storage regions 111, 112, . . . storing the tune data per tune. One or a plurality of data type tune data corresponding to a display capacity of the cellular phone terminal units 50, 60 are stored in each of the tune data storage regions 111, 112, . . . with respect to the same tune. For example, there is shown a state in which the tune data of sixty four tones, sixteen tones and four tones (these show the simultaneous generating number) in correspondence to a tune AAA is stored in the tune data storage region 111 of the information providing server 100 in FIG. 1.

An information indicating a voice display capacity of the cellular phone terminal unit 50 (for example, "x-sound:##" [## corresponds to a numeral indicating the voice display capacity]) is contained in an access request to the HTTP server 120, for example, in an expanded header under the HTTP request, and the HTTP server 120 can recognize the voice display capacity of the cellular phone terminal units 50, 60 or the like in correspondence to the information.

The information providing server 200 provides an image data, for example, an awaiting image or the like. The information storage portion 210 is provided with image date storage regions 211, 212, . . . , for example, storing an image data per image. One or a plurality of data type image data corresponding to the display capacity of the cellular phone terminal units 50, 60 are stored in each of the image data storage regions 211, 212, . . . with respect to the same image. For example, there is shown a state in which the image data of 256 colors and 4096 colors (these show a number of simultaneous color development) corresponding to an image BA or an image data of 65536 colors and QVGA (240×320 pixel) is stored in the image data storage region 211 of the information providing server 200 in FIG. 1.

An information indicating an image display capacity of the cellular phone terminal unit 50 (for example, "x-color:$$" [$$ corresponds to a character string indicating the image display capacity]) is contained in an access request to the HTTP server 220, for example, in an expanded header under the HTTP request, and the HTTP server 220 can recognize the image display capacity of the cellular phone terminal units 50, 60 or the like in correspondence to the information.

(Structure of Search Server)

The search server 20 is provided with a crawling portion (a crawling means) 21 gobbling down the address and the data class of the contents or the like provided by the information providing server group 10 in accordance with a predetermined key word or the like, a DB 22 holding the address, the data class or the like gobbled down by the crawling portion 21 in correspondence to the key word or the like, and a search service providing portion (a searching means and a generation detecting means) 23 providing a search service to the cellular phone terminal unit 50, 60 or the like, and the like.

Figure 2:
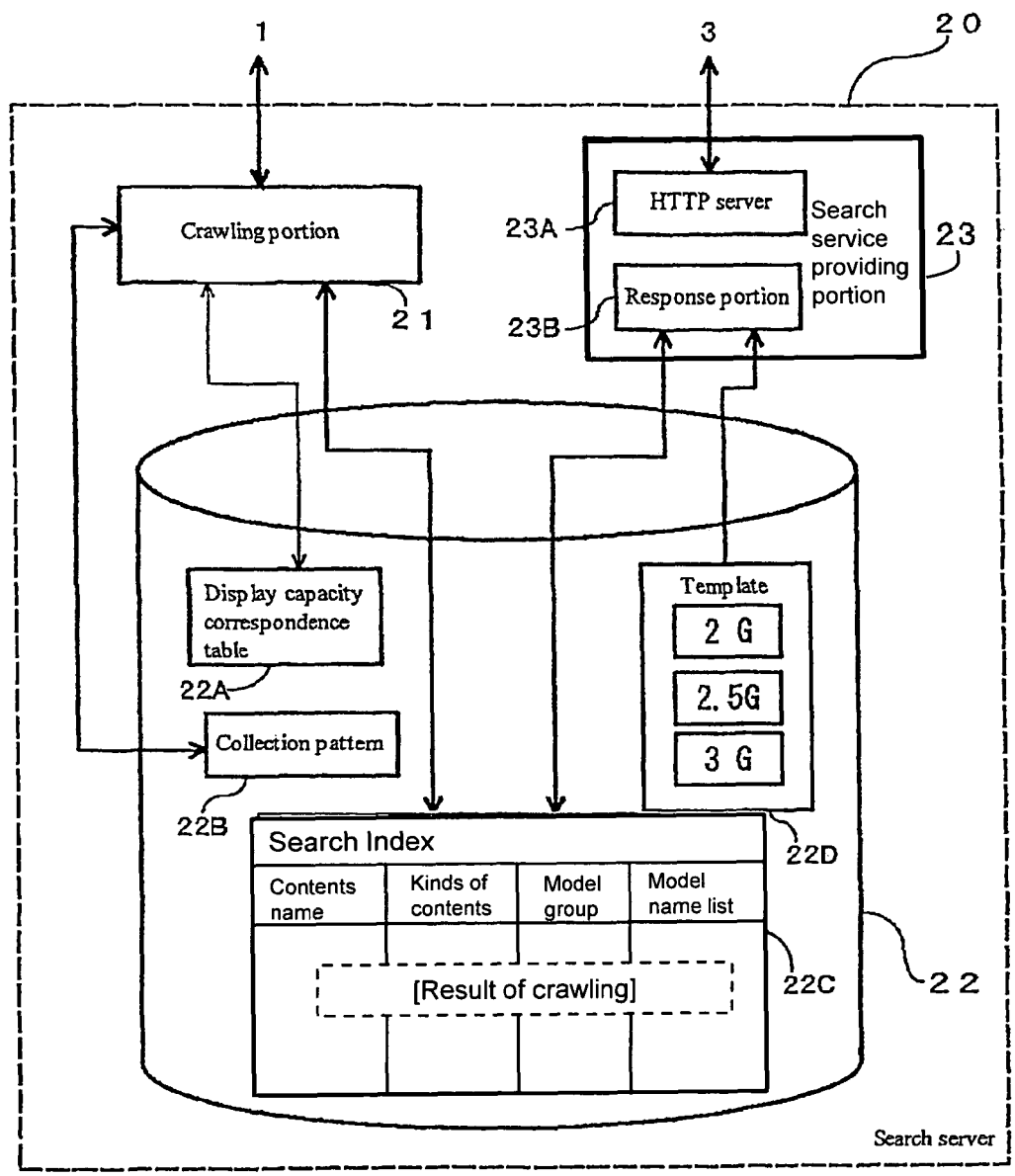
FIG. 2 is a block diagram showing a structure of a search server constructing the information providing system.

In the DB 22, there are stored a display capacity correspondence table 22A holding the display capacity per the model of the cellular phone terminal units 50, 60 per predetermined model group, a collection pattern 22B defining a pattern of the crawling by the crawling portion 21, a search index 22C holding a result of crawling, and a template 22D used for generating a search result per generation of the cellular phone terminal unit 50 and the cellular phone terminal unit 60, for example, as shown in FIG. 2.

The crawling portion 21 repeats the access (crawls) to the information providing servers 100, 200 in the same manner as the HTTP client in correspondence to the collection pattern 22B, and stores a result of access in the search index 22C.

Further, the search service providing portion 23 is provided with an HTTP server 23A functioning as a front end responding to the search service request from the cellular phone terminal units 50, 60, and a response portion (a search result generating means) 23b searching the corresponding information from the search index 22C in correspondence to the key word supplied via the HTTP server 23A and structuring a response message by using the template 22D.

The mobile communication network 30 is structured such as to provide a mobile communication service to the cellular phone terminal unit 50 of a second generation (executing a data communication on the basis of a line switching) and a 2.5 generation (executing the data communication on the basis of a packet switching) in accordance with the PDC system mentioned above, and is provided with a line switching device 31 executing a process such as an allocation of a communication channel with respect to the cellular phone terminal unit 50, a packet switching device 32 executing a process such as a packet switching for the data communication, base station units (BS: base station) 33a, 33b, . . . , 33n executing a wireless communication with respect to the cellular phone terminal unit 50, a base station control unit BSC 34 executing a management of the BS 33a to 33n, and a gateway unit (GW) 35 executing a protocol conversion of the communication by the second generation cellular phone terminal unit 50 or the like.

The mobile communication network 40 is structured such as to provide a mobile communication service to the cellular phone terminal unit 60 of a third generation in accordance with the W-CDMA system mentioned above, and is provided with base station units (NB: node B) 42a, 42b, . . . , 42m executing a communication with respect to the cellular phone terminal unit (UE: user equipment) 60, and RNC 41a, 41b, . . . , 41m executing a control of each of the base station units 42a to 42m.

(Detail of Cellular Phone Terminal Unit)

The cellular phone terminal unit 50 is structured such as to be capable of utilize a message service, a mail service and the like via the mobile communication network 30, and utilizing a contents providing service provided by the information providing server group 10 and a search service provided by the search server 20. The cellular phone terminal unit 50 is provided with a radio frequency (RF) portion 51 executing a process of a radio-frequency signal, an MPU 52, a memory 53, an operation key 54 inputting a command or the like from a user, a display portion 55 executing a display with respect to the user, a voice CODEC 56 executing an encode/decryption of the voice signal, an MIC 57 and a speaker 58.

The MPU 52 executes a control program, for example, held in the memory 53, thereby serving as a communication control portion 510 executing a control of the communication via the mobile communication network 30, an electronic mail client 520 sending and receiving the electronic mail, and a Web browser 530 displaying an image at a time of utilizing the information providing service and the search service mentioned above. Further, within the memory 53, there are provided a voice data holding portion 53a holding the voice data such as the melody signaling the incoming call or the like, and an image data holding portion 53b holding an image data such as the awaiting screen or the like.

The cellular phone terminal unit 60 is also provided with the electronic mail client, the Web browser and the like, in the same manner as the cellular phone terminal unit 50, and is structured such as to be capable of utilizing the contents provided by the information providing servers 100, 200.

Figure 3:
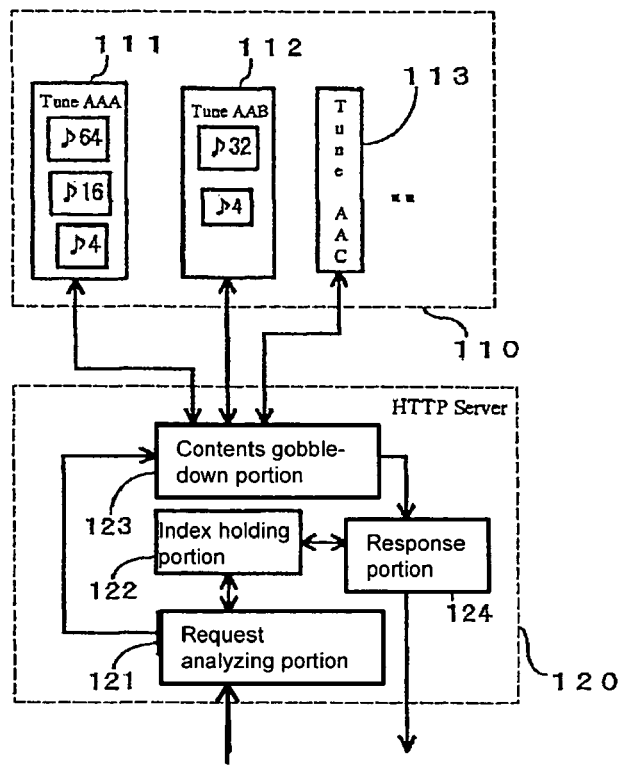
FIG. 3 is a view showing an example of a detailed structure of an information providing server constructing the information providing system.

The HTTP server 120 mentioned above is provided with a request analyzing portion 121 analyzing a request from the cellular phone terminal unit 50 or the like supplied via the network 1, an index holding portion 122 holding an index data having an address showing the provided information, a contents gobble-down portion 123 gobbling down the contents from the information storage portion 110 in correspondence to the command from the request analyzing portion 121, and a response portion 124 sending a response to the cellular phone terminal units 50, 60 or the like from the information gobbled down by the contents gobble-down portion 123, for example, as shown in FIG. 3. The HTTP server 220 is also provided with the same structure as that of the HTTP server 120.

Figure 4:
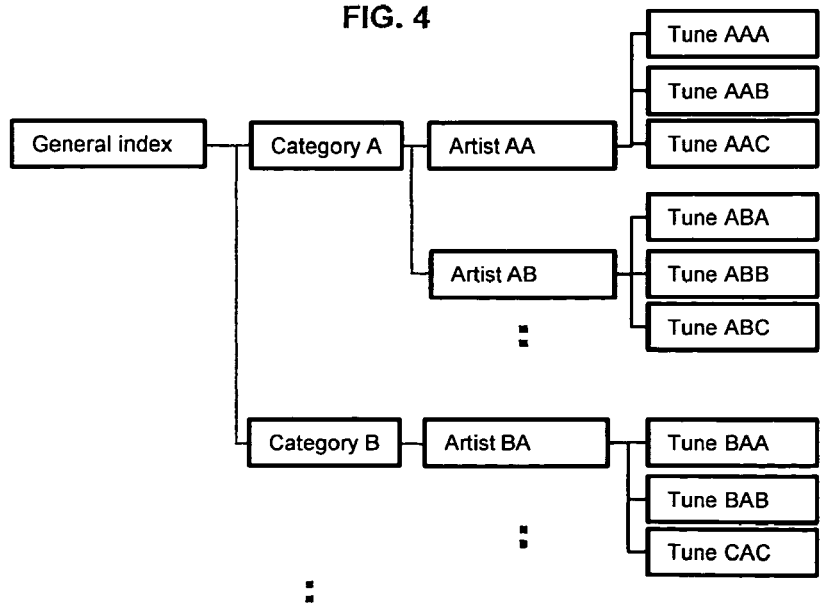
FIG. 4 is a view showing an example of a structure of an index data held in an index holding portion of the information providing server.

The index data held in the index holding portion 122 is structured such as to be classified hierarchically, for example, as shown in FIG. 4, in such a manner that the information (for example, the tune data) can be hierarchically selected. Further, the index data held in the index holding portion 122 is structured such as to be classified hierarchically in the same manner. The index data is structured by a page description data, for example, a hyper text markup language (HTML) type or the like, and is structure such that a hierarchical link structure is formed by describing a link indicating an address (URL, URL or the like) of a lower-level index in a page description data of a higher-level index.

In accordance with the index of the hierarchical structure, the user first selects a category from a general index, next selects an artist from an index per the category, and selects a tune from an index per the artist, whereby it is possible to hierarchically select the tune data.

In this case, if the number of the artists, the tune data or the like is increased, a picking in the index in each of the hierarchies is increased. As a result, the items in the index in each of the hierarchies is increased, for example, there is generated a necessity that the user checks the whole by scrolling, and a labor hour required until searching the target tune is increased. Accordingly, for example, it is considered to break the hierarchical structure into parts. However, since the selecting number of the hierarchies is increased, the labor hour of the user is not reduced very much.

Therefore, the information providing system provides the search service about the information provided by the information providing servers 100, 200, . . . , on the basis of the search server 20. Further, the information providing service is structured such as to provide a proper search result in correspondence to the display capacity of the cellular phone terminal units 50, 60.

(Crawling Operation)

A description will be given below of a case that a tune data of a tune AAA, for example, a synthetic music mobile application format (SMAF) type data of sixty four tones and sixteen tones and the SMD type data of four tones are stored in the tune data storage region 111 of the information providing server 100.

The crawling portion 21 gobbles down the address (URL) of the contents (the tune data) provided by the HTTP server 120, for example, via a link structure of the index data provided by the HTTP server 120. The crawling portion 21 first gobbles down the data of the general index from the HTTP server 120, and searches the description of the link of the tune data sequentially via the lower-level index. If the link of the tune data is found, the crawling portion 21 determines whether or not a file name of the tune data, an explanation in the description of the link or the like corresponds to any of the key words (for example, "AAA") in the key word (k/w) list 22E in the DB 22. If the link corresponding to the key word exists, the address in the link is registered in the search index 22C in correspondence to the key word.

The operation mentioned above (the crawling operation) is executed per the display capacity of the cellular phone terminal units 50, 60. In the display capacity correspondence table 22A, for example, as shown in FIG. 5, there are stored an identification information (a model group) indicating the group, a model name (a representative) indicating the typical model within the group, and correspondence tables 22AA, 22AB and 22AC indicating a correspondence to the model name (a model name list) indicating the model, per the group of the cellular phone terminal units. The correspondence tables 22AA, 22AB and 22AC are provided per the kind of the contents. Further, the display capacity (for example, a simultaneous sound production number, a correspondence format or the like) corresponding to the identification information is stored, for example, as a correspondence table shown in FIGS. 6 and 7, in the DB 22 or the like. In this case, if the structure is made such that a corresponding relation between the identification information and the contents can be known in accordance with a method of storing the contents per the display capacity corresponding to the identification information in the directory corresponding to the identification information at a time of storing the contents in the information storage portions 110, 210, it is not necessary that the correspondence tables are provided.

The crawling portion 21 selects the correspondence table corresponding to the subject to be searched from the display capacity correspondence table 22A at a time of requesting the data such as the general index or the like to the HTTP server of the information providing server, and sends an HTTP request having the expansion header generated by using the information indicating the model name of the typical model and the display capacity per the model group in the selected correspondence table. For example, in the case that the address (URL) of the general index of the HTTP server 120 providing the tune data is constituted by http://meloJAM.com/index.html, the HTTP request generated by the crawling portion 21 becomes, for example, "GET http://meloJAM.com/index.html HTTP/1.1 V-SH02x-color:C4096 x-sound: 2/6 KB". In this case, "V-SH02" in the HTTP expansion header corresponds to a character indicating the model name of the cellular phone terminal unit. Further, "x-sound:2" corresponds to a character indicating the model group mentioned above. The voice display capacity corresponding to the character can gobble down the identification information of the model group as a key (a terminal attribute ID) from the correspondence table shown in FIG. 6 mentioned above. If the voice display capacity corresponding to "2" is gobbled down from FIG. 6, it is known that the number of simultaneous vocalization is 16 and it corresponds to the data of the SMD type and the SMAF type.

Further, "x-color:C4096" in the expansion header indicates that the number of simultaneous color development corresponds to 4096 color, and the portion "6 KB" indicates that an upper limit value of the page description data such as the index data or the like corresponds to 6 kilo bite.

The crawling as mentioned above is executed, for example, in accordance with a collection pattern file having a structure shown in FIG. 8. In the collection pattern, there are defined a character (for example, "PATTERN1") indicating the individual collection pattern, a character (for example, http://www.aaa.co.jp/ or the like) indicating an address (URI) of a site starting the collection of the data in the collection pattern, and a character indicating an agent name showing a setting used in the collection.

Further, in correspondence to the individual agent name, for example, in an agent definition file shown in FIG. 9, there are defined an agent name, a version of the browser, an expansion header per the model group, a page upper limit value and the like. The table may be generated by using the display capacity correspondence table 22A mentioned above, for example, at a time of searching, however, may be previously prepared and stored in the DB 22.

Figure 10:
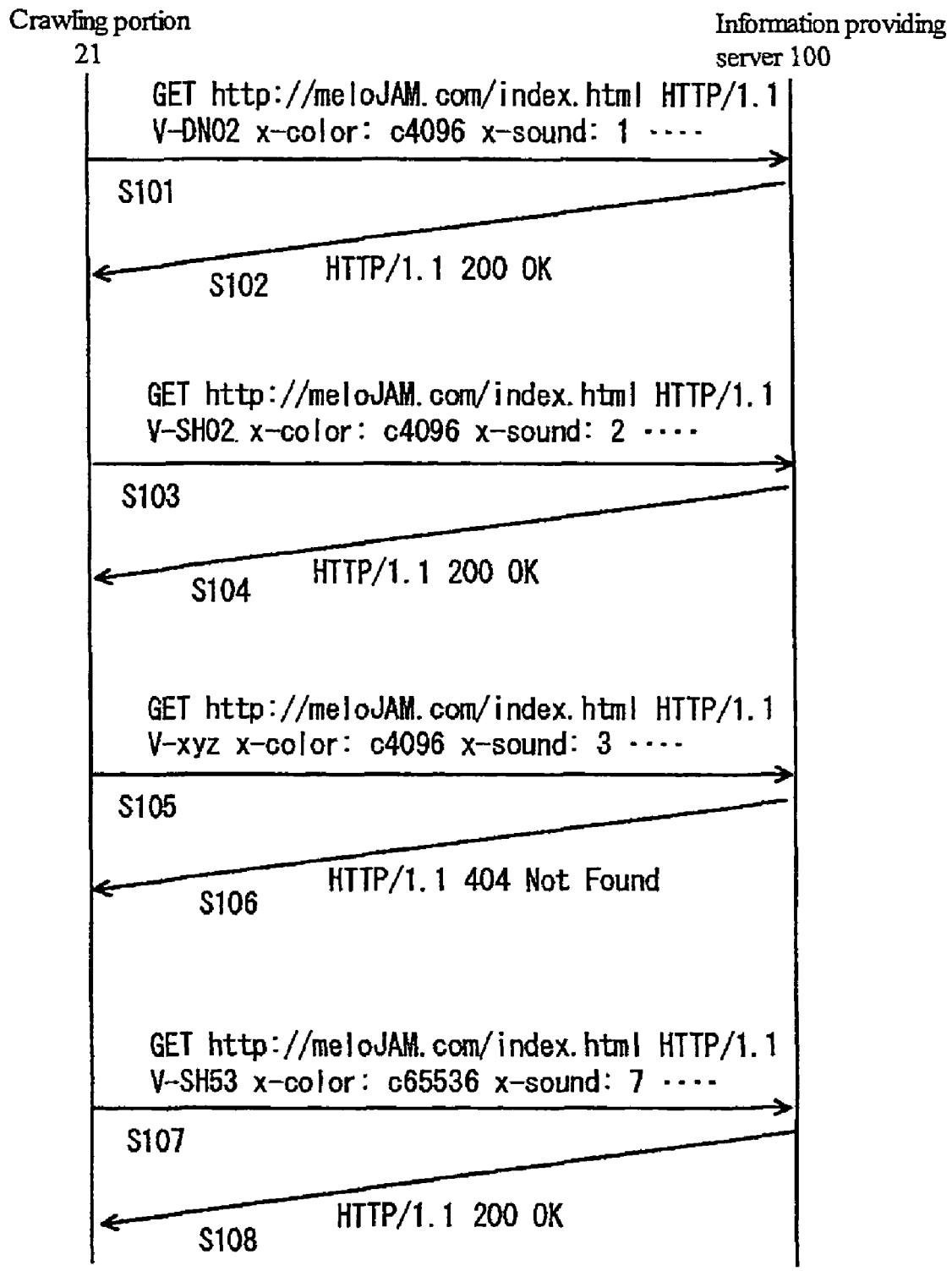
FIG. 10 is a sequence diagram showing an example of a crawling operation by a crawling portion of the search server constructing the information providing system.

The crawling portion 21 generates the HTTP request mentioned above by referring to the agent definition file shown in FIG. 9, and executes the crawling in accordance with the collection pattern shown in FIG. 8 mentioned above. In particular, for example, as shown in FIG. 10, the crawling portion 21 sequentially changes the information "x-sound:xxx" indicating the voice display capacity of the cellular phone terminal unit within the HTTP expansion header in accordance with the agent defined in the collection pattern file in FIG. 8 mentioned above so as to repeat the HTTP request to the HTTP server 120 (S101, S103, S105, S107).

Further, the crawling portion 21 specifies the kind of the contents corresponding to the HTTP request from responses (S102, S104, S106, S108) of the HTTP server 120 to the respective HTTP requests, and registers in the search index 22C of the DB 22.

The HTTP server 120 has the index information shown in FIG. 4 mentioned above per the contents (for example, the tune data) provided by the HTTP server 120 within the terminal attribute ID (corresponding to the voice display capacity of the cellular phone terminal unit) in FIG. 6 mentioned above, and is structured such as to supply the index information corresponding to the voice display capacity of the cellular phone terminal unit. The embodiment in FIG. 1 mentioned above has the index information of the SMD type of four tones and the SMAF type of sixteen tones and sixty four tones, however, does not have the index information of the SMAF type of thirty two tones because the HTTP server 120 does not provides.

If the HTTP request is supplied as mentioned above (S101, S103, S105, S107), the request analyzing portion 121 of the HTTP server 120 determines the voice display capacity in the terminal side on the basis of the terminal attribute ID of "x-sound:n" ("n" corresponds to the terminal attribute ID indicating the voice display capacity) in the expansion header of the HTTP request. If the index information corresponding to the voice display capacity exists, the request analyzing portion 121 makes the response portion 124 send the index information (S102, S104, S108). On the other hand, in the case that the index information corresponding to the voice display capacity does not exist, the request analyzing portion 121 makes the response portion 124 send the response message that the index information does not exist (S106).

Further, the crawling portion 21 gobbles down the index information existing in the information providing server 100, and searches whether or not the file name, the character or the like corresponding to the key word previously registered in the DB 22 exists. If something corresponding to the key word exists, the crawling portion 21 registers the identification information indicating the model group of the voice display capacity of the terminal, the model name list belonging to the model group, the address of the contents and the like in the search index 22C in correspondence to the key word, for example, as shown in FIG. 11.

In accordance with the operation mentioned above, the search index 22C corresponding to the voice display capacity of the cellular phone terminal unit is prepared. Since the corresponding model name is registered in the search index 22C, it is easy to abstract the search result in correspondence to the model name of the cellular phone terminal unit requesting the search service. Further, with respect to the image data provided by the information providing server 200, it is possible to prepare the search index 22C corresponding to the image display capacity of the cellular phone terminal unit as shown in FIG. 11, by requesting the index information to the HTTP server 220 by sequentially changing the information "x-color:yyy" indicating the image display capacity in the expansion header, and executing the key word search in the index information in the same manner as mentioned above.

(Search Service)

The search service providing portion 23 provides the search service to the Web browser 530 of the cellular phone terminal unit 50 or the like asynchronously with the crawling operation as mentioned above.

Figure 12:
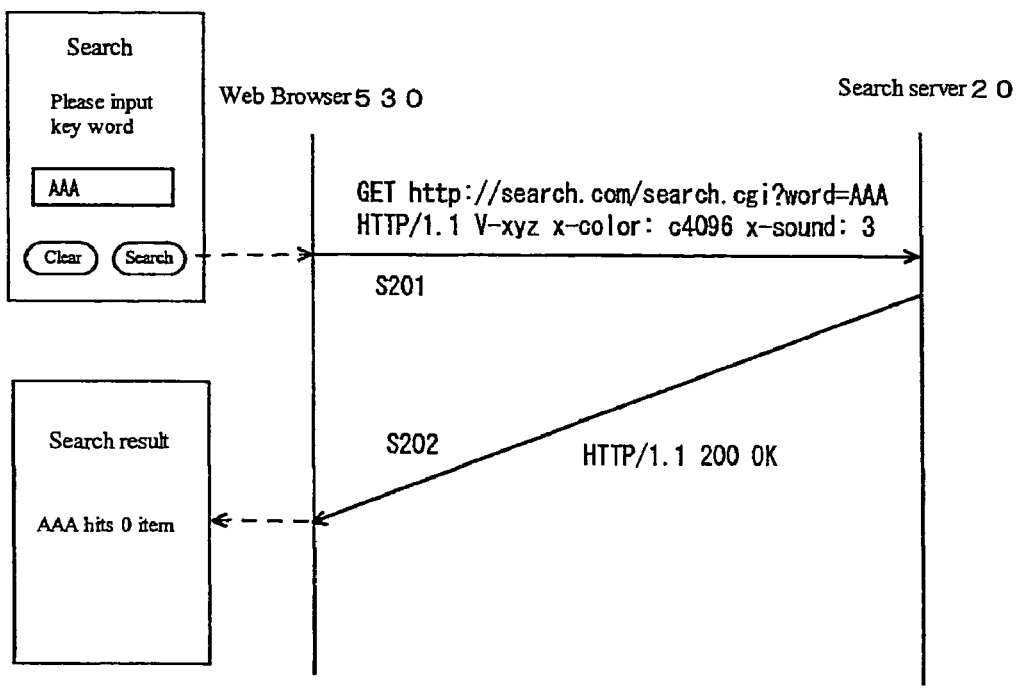
FIG. 12 is a sequence diagram showing an example of an operation in a search service by the search server.

If the use of the search service is instructed from the user, the Web browser 530 requests the data for inputting the search condition to the search service providing portion 23. If the data is supplied from the search service providing portion 23 in response to this, the Web browser 530 displays a search term input screen on a display screen of the display portion 55, for example, as shown in FIG. 12. In the case that the voice display capacity of the cellular phone terminal unit 50 is constituted by thirty two tones, if the user inputs the search condition (for example, the tune name "AAA") and instructs the search, the Web browser 530 sends the character indicating the search condition and the HTTP request including the expansion header including the model name "V-xyz" of the cellular phone terminal unit 50 to the search service providing portion 23 (S201).

The search service providing portion 23 abstracts the information corresponding to the character (for example, "AAA") indicating the search condition in the HTTP request supplied from the Web browser 530 and the model name (for example, "V-xyz") in the expansion header from the search index 22C, generates the response message (the search result) including the hitting number, the tune name, the link information with respect to the address of the tune data or the like, and sends to the Web browser 530 (S202). When receiving the response message, the Web browser 530 displays the search result list screen corresponding to the search result as shown in the figure.

In the embodiment shown in FIG. 1 mentioned above, the tune data of the tune AAA corresponding to the voice display capacity (thirty two tones) of the cellular phone terminal unit (model name "V-xyz") does not exist in the tune data storage region 111, and the information about the tune data of thirty two tones of the tune AAA corresponding to the model name "V-xyz" is not registered in the search index 22C obtained by the crawling as shown in FIG. 11 mentioned above. Accordingly, the search result provided by the search service providing portion 23 becomes in a state in which the hitting number is zero and the information about the tune data of the tune AAA is not included, as shown in FIG. 12.

Figure 13:
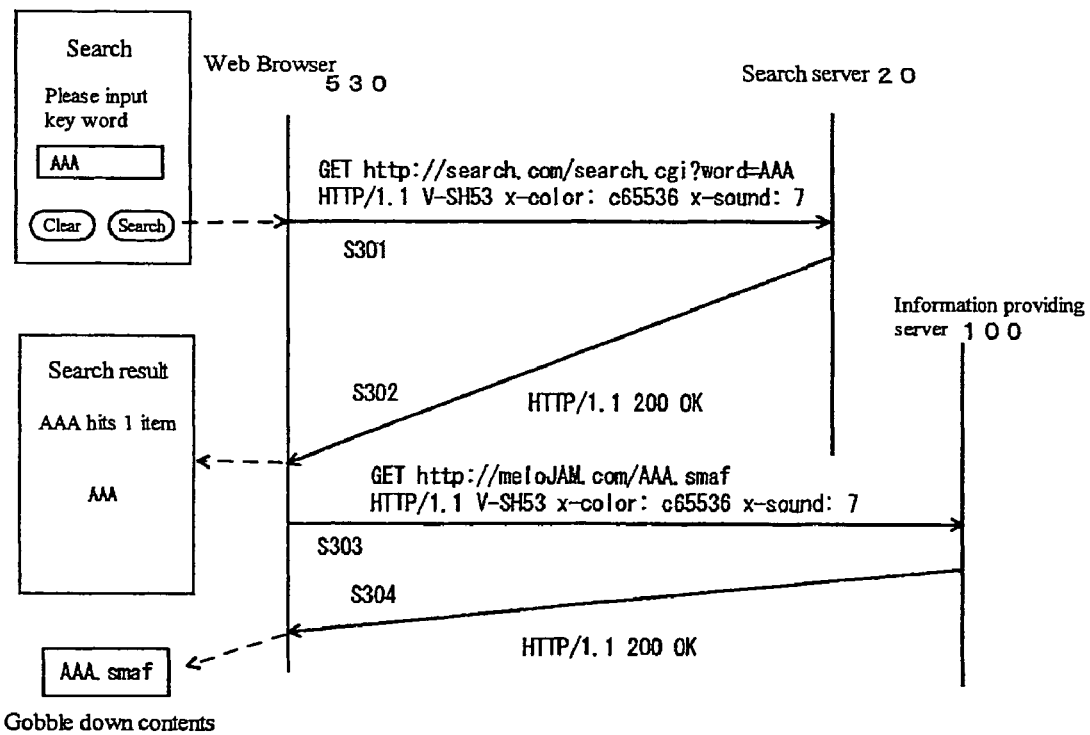
FIG. 13 is a sequence diagram showing an example of another operation in the search service.

Further, in the case that the search is requested from the cellular phone terminal unit (for example, the model name "V-SH53") in which the voice display capacity is constituted by sixty four tones, under the search condition of the tune name "AAA" in the same manner as the embodiment in FIG. 12 mentioned above, the model name "V-SH53" of the cellular phone terminal unit is included in the expansion header of the HTTP request supplied to the search service providing portion 23 (S301), for example, as shown in FIG. 13. In the embodiment shown in FIG. 1 mentioned above, the tune data of sixty four tones corresponding to the tune AAA exists in the tune data storage region 111, and the information about the tune data of sixty four tones of the tune AAA corresponding to "V-SH53" is registered in the search index 22C as shown in FIG. 11 mentioned above. Accordingly, the search result provided by the search service providing portion 23 becomes in a state in which the information about the tune data of the tune AAA is included (S302) as shown in FIG. 13.

If the user confirming the search result mentioned above selects the tune, the Web browser 530 requests the provision of the tune data corresponding to the tune selected by the user to the corresponding information providing server 100, in correspondence to the link information corresponding to the selected tune (S303). In the request (the HTTP request), the information (x-sound:7) indicating that the voice display capacity of the cellular phone terminal unit 50 is constituted by sixty four tones is included in the expansion header, and the HTTP server 120 of the information providing server 100 supplies the corresponding tune data of sixty four tones to the cellular phone terminal unit 50 (S304).

In this case, in the template 22D in the DB 22, there is stored a template used for generating the search result per the generation of the cellular phone terminal unit, for example, as shown in FIGS. 14, 17 and 18. Meaning of variables in the templates and meaning of command are respectively shown in FIG. 15 and FIG. 16. The generation of the cellular phone terminal unit can be determined, for example, in accordance with an access path with respect to the search service providing portion 23. In other words, in the cellular phone terminal unit of second generation (2G), the Web browser 530 accesses the HTTP server 23A via the line switching device 31 and the GW 35. In the cellular phone terminal unit of 2.5 generation (2.5G), the Web browser 530 access the HTTP server 23A via the packet switching device 32. Further, in the cellular phone terminal unit of third generation (3G), the Web browser 530 accesses the HTTP server 23A via the RNC 41a (41b). The communication is executed between the GW 35, the packet switching device 32 and the RNC 41a (41b), and the search service providing portion 23, by using the TCP/IP protocol serving as the higher-level protocol, and the search service providing portion 23 can determine what generation the cellular phone terminal unit belongs to, on the basis of the IP address of the accessing portion.

The search service providing portion 23 employs the template shown in FIG. 14 if the accessing cellular phone terminal unit is of the second generation. If the accessing cellular phone terminal unit is of the 2.5 generation, the search service providing portion 23 employs the template shown in FIG. 17. Further, if the accessing cellular phone terminal unit is of the third generation, the search service providing portion 23 employs the template shown in FIG. 18. Accordingly, the search service providing portion 23 generates the response message with respect to the cellular phone terminal unit.

In particular, for example, in the case that the cellular phone terminal unit is of the second generation, and the search result about "AAA" is constituted by one item, the data of the search result generated by the response portion 23b by using the template shown in FIG. 14 mentioned above comes to, for example, as shown in FIG. 19. The image displayed on the display portion 55 in correspondence to the data of the search result comes to, for example, the image displayed in S302 in FIG. 13.

Figure 20:
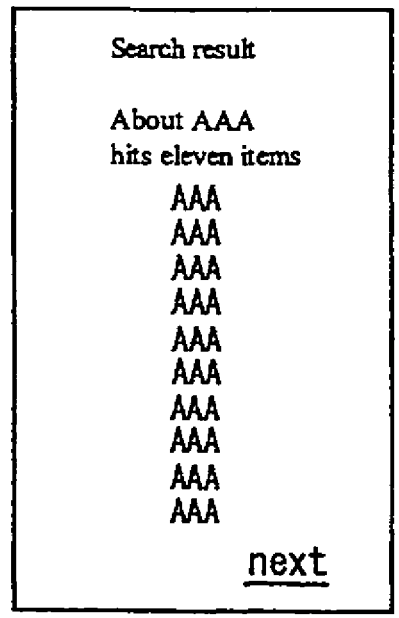
FIG. 20 is a view showing an example of an image displayed on the basis of the data of another search result.
Figure 21:
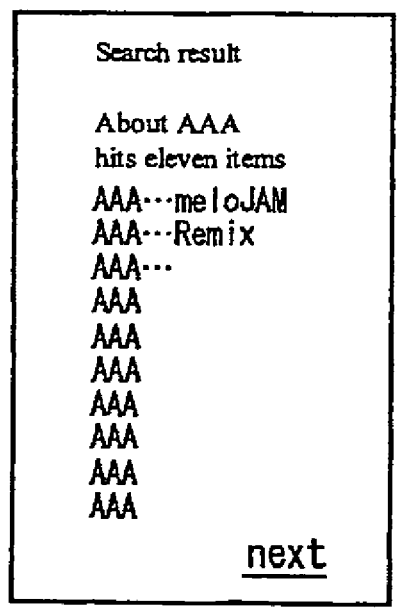
FIG. 21 is a view showing an example of an image displayed on the basis of the data of another search result.

Further, in the case that the cellular phone terminal unit is of the 2.5 generation, and the search result about "AAA" is constituted by eleven items, the image displayed on the display portion 55 in correspondence to the data of the search result generated by the response portion 23b comes to, for example, as shown in FIG. 20. Further, in the case that the cellular phone terminal unit is of the third generation, and the search result about "AAA" is constituted by eleven items, the image displayed on the display portion 55 in correspondence to the data of the search result generated by the response portion 23b can display the information such as an explanation about each of the contents, for example, as shown in FIG. 21.

As mentioned above, it is possible to change the number of the display items of the search result, the contents or the like, for example, per the generation of the cellular phone terminal unit, and generate the proper search result in correspondence to the display capacity of the cellular phone terminal unit, by generating the search result by means of the template corresponding to the generation of the cellular phone terminal unit.

The description is given above of the example in the case of the tune data, however, the search service providing portion 23 abstracts the data from the search index 22C so as to send the search result to the cellular phone terminal unit, in correspondence to the model name in the expansion header of the HTTP request, in the same manner with respect to the image data.

(Effect)

In the case that the search is executed without taking the display capacity of the cellular phone terminal unit into consideration, the information which can not be utilized by the cellular phone terminal unit is included in the search result, and it is necessary for the user to determine whether or not the information is constituted by the contents which can be displayed by the cellular phone terminal unit by tracking back the link one by one.

On the contrary, in the information providing system, as mentioned above, the search service providing portion 23 can supply only the tune data corresponding to the model name of the cellular phone terminal unit as the search result from the search index 22C. Since the information about the model name of the cellular phone terminal unit within the predetermined model group and the available contents is registered in the search index 22C in a coordinating manner, it is possible to supply only the information about the contents which can be displayed by the cellular phone terminal unit as the search result.

Accordingly, in the information providing system, it is possible to reduce the number of operation by the user until the user gobbles down the available contents, and it is possible to contribute to the reduction of the operation load of the user. Further, since it is possible to reduce a possibility of accessing the tune data which can not be utilized by the cellular phone terminal unit, it is possible to reduce the wasteful traffic and it is possible to contribute to the saving of the communication cost.

Further, in the information providing system, since the crawling is executed per the model group which is set per the kind of the contents such as the tune data, the image data or the like, it is possible to inhibit increase of the number of the access with respect to the information providing server for generating the proper search index 22C corresponding to the display capacity of the cellular phone terminal unit from being increased.

Further, in the information providing system, since the date in the search index 22C is generated per the model group having the same display capacity, it is possible to contribute to a speed-up of the search by reducing the number of reference of the data in the DB 22 in comparison with the case of independently having the table of the model names within the model group.

Further, in the information providing system, since the image display capacity such as the number of the characters which can be displayed on the display portion 55 or the like is determined per the generation of the cellular phone terminal unit, it is possible to generate the proper search result corresponding to the display capacity of the display portion 55, by generating the search result by using the template corresponding to the generation.

Embodiment 2

In the embodiment 1 mentioned above, the description is given of the case that the search result including the address (URL) of the contents such as the tune data or the like is provided as the search result by the search server 20 to the cellular phone terminal unit, however, there is a case that it is desired to access the information providing server via a page (the page to be linked) including the information such as an advertisement, a caution or the like.

In the case mentioned above, there is considered a matter that the address of the page to be linked is registered in the search index 22C and the address of the page to be linked is provided in the search result, for example, as shown in FIG. 22. However, if only the address of the page to be linked is simply provided, it is necessary for the user to again select the target contents in correspondence to the index information, and there is room for improvement for the purpose of lightening the operation load.

Accordingly, the structure may be made such that the key word is put in the search result of the search server 20, and the key word can be provided to the information providing server at a time of requesting the data of the contents to the information providing server from the cellular phone terminal unit.

Figures 23, 24:
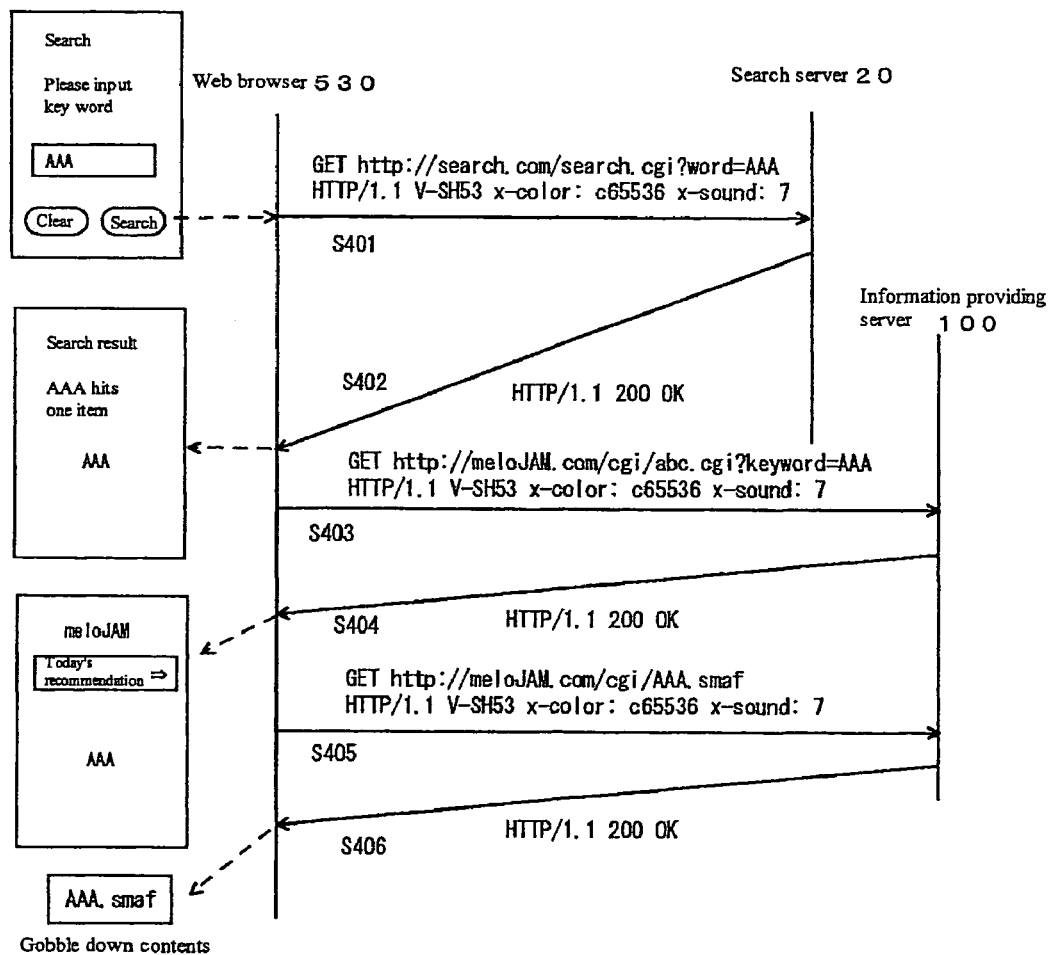
FIG. 23 is a view showing an example of a data of a search result generated by a search server constructing the information providing system.
FIG. 24 is a sequence diagram showing an example of an operation in a search service by the search server.

In particular, for example, when the search service providing portion (the search result generating means) 23 generates the search result by using the template 22D, the information ("key word=AAA") is added to the address ("http://melo-JAM.com/cgi/abc.cgi?") of the contents gobbled down from the search index 22C and the address to be linked ("http://meloJAM.com/cgi/abc.cgi?key word=AAA") is set, for example, as shown in FIG. 23. In this case, the portion of "AAA" indicating the key word is actually escape encoded (a type of "% xx") by a character code corresponding to the generation of the cellular phone terminal unit. In other words, in the case of the cellular phone terminal unit of the second generation, the character code employs, for example, Shift-JIS, and in the case of the cellular phone terminal units of the 2.5 generation and the third generation, the character code employs, for example, a character code corresponding to the setting of the cellular phone terminal unit in Shift-JIS, UTF-8, EUC-JP and ISO-2022-JP.

The key word encoded in the address is supplied as a part of the GET command to the information providing server at a time of requesting the data of the contents selected by the user, for example, as shown in FIG. 24 (S403). When the request analyzing portion 121 of the information providing server receives the GET command mentioned above, the request analyzing portion 121 gobbles down the address of the contents corresponding to the key word "AAA" from the index holding portion 122, and adds the description of the link with respect to the contents to the data of the page to be linked having the information such as the image or the like such as the advertisement or the like so as to send to the response portion 124 (S404).

The Web browser 530 of the cellular phone terminal unit displays the image corresponding to the data of the page to be linked as mentioned above on the display portion 55. If the user selects the gobble-down of the contents, the Web browser 530 requests the data of the contents to the information providing server (S405). If the data of the contents is supplied from the information providing server in correspondence to this (S406), the Web browser 530 stores the supplied data in the memory 53.

Accordingly, in the information providing system, it is possible to provide the address of the target page (the address to be linked) as the search result to the user, in addition to the effect of the embodiment 1 mentioned above. Accordingly, for example, it is possible to provide the contents via the page having the information such as the advertisement or the like without increasing the operation load of the user.

INDUSTRIAL APPLICABILITY

It is possible to apply to the search system reducing the load of the user, by returning the proper search result in correspondence to the display capacity of the cellular phone terminal unit.

What is claimed is:

1. A search device providing search results to a requesting terminal unit, the search results including at least one address corresponding to content provided by a content providing server capable of providing content, the content provided by the content providing server corresponding to information showing a capacity of the requesting terminal unit included in an information request command along with a key word from the requesting terminal unit, the search device comprising:
   a search server that provides:
      a crawling device for searching predetermined addresses corresponding to said content by using the information showing the capacity of the requesting terminal unit according to a typical model of the requesting terminal unit in a model group, the model group being set according to the capacity;
      a search index holding the predetermined-addresses corresponding to the content obtained by said crawling device in correspondence to an identifier that identifies the requesting terminal unit in the model group at a time of crawling;
      a searching device for searching the predetermined addresses in said search index according to search criteria, the search criteria including the key word and the identifier included in the information request command from the requesting terminal unit, the key word being different from the identifier and the searching of the predetermined addresses in the search index being based on the search criteria and according to the capacity information of the requesting terminal unit identified by the identifier; and
      a search result generating device for generating a search result including said predetermined addresses searched by the searching device.

2. The search device as claimed in claim 1, wherein said model group is provided per kind of the content.

3. The search device as claimed in claim 1, further comprising:
a template corresponding to every said terminal units of a plurality of generations in which the capacities of the search results are different; and
a generation detecting device for detecting the generation of the terminal unit to which the information request command to said search means is supplied,
wherein the search result generating device generates the data of the search result in correspondence to the generation of the terminal unit detected by said generation detecting device.

4. The search device as claimed in claim 1, wherein the capacity includes a content display capacity.

5. The search device as claimed in claim 1, wherein the identifier that identifies the terminal unit is a model name.

6. An information providing system, comprising:
a content providing server capable of providing content, the content provided by the content providing server including data corresponding to information showing a capacity of a terminal unit included in an information request command; and
a search device, coupled to the content providing server, that provides:
a crawling device for searching at least one address of said content by using the information showing the capacity of the terminal unit according to a typical model of the terminal unit in a model group, the model group being set according to the capacity;
a search index holding the at least one address of the content obtained by said crawling device which correspond to content corresponding to an identifier that identifies the terminal unit in the model group at a time of crawling; and
a searching device for searching the at least one address of the content in said search index according to search criteria, the search criteria including requested content by the terminal unit and the identifier included in the information request command from the terminal unit, the requested content being different from the identifier and the searching of the at least one address of the content in the search index being based on the search criteria and according to the capacity information of the requesting terminal unit identified by the identifier.

7. The information providing system as claimed in claim 6, wherein the capacity includes a content display capacity.

8. The information providing system as claimed in claim 6, wherein the identifier that identifies the terminal unit is a model name.

9. An information searching system, comprising:
a content providing server capable of providing content, the content provided by the content providing server including content corresponding to information showing a capacity of a terminal unit included in an information request command and a key word; and
a search device, coupled to the content providing server, that provides:
a crawling device for searching at least one predetermined address corresponding to said content by using the information showing the capacity of a typical model of the terminal unit in a model group, the model group being set according to the capacity;
a search index holding the at least one predetermined address of the content obtained by said crawling device in correspondence to a an identifier that identifies the terminal unit in the model group at a time of crawling;
a searching device for searching the at least one predetermined address in said search index which according to search criteria, the search criteria including the key word and the identifier included in the information request command from the terminal unit, the key word being different from the identifier and the searching of the at least one predetermined address in the search index being based on the search criteria and according to the capacity information of the requesting terminal unit identified by the identifier; and
a search result generating device for generating a search result including said predetermined addresses searched by the searching device.

10. The information searching system as claimed in claim 9, wherein the capacity includes a content display capacity.

11. The information searching system as claimed in claim 9, wherein the identifier that identifies the terminal unit is a model name.

12. A method for providing a search service, comprising:
providing a server that includes data;
receiving, at the server, a request generated for a requesting device corresponding to the data in the server, wherein the request includes capacity information of the requesting device and requested content;
searching the data in the server to provide search results according to search criteria, the search criteria including the capacity information of the requesting device and the requested content, the requested content being different from the capacity information of the requesting device and the searching of the data in the server being based on the search criteria and according to the capacity information of the requesting device; and
sending the search results to the requesting device in response to the request, wherein the search results correspond to the capacity information of the requesting device and the requested content.

13. The method as claimed in claim 12, wherein the capacity information includes display capacity information of the requesting device.

14. The method as claimed in claim 12, wherein the identification information includes a model name of the requesting device.

15. The method as claimed in claim 12, wherein the requesting device is a cellular phone.

16. An information providing server system, comprising:
at least one information providing server, having at least one processor and a memory, and that includes:
a storage portion that stores information corresponding to a request generated for a requesting device, the request including capacity information of the requesting device and requested content;
a search device that searches the information in the storage portion to provide search results according to search criteria, the search criteria including the capacity information of the requesting device and the requested content, the requested content being different from the capacity information of the requesting device and the searching of the information in the storage portion being based on the search criteria and according to the capacity information of the requesting device; and a content server, coupled to the storage portion, that provides search results to the requesting device in response to the request, wherein the search results vary according to the capacity information of the requesting device and according to the requested content.

17. The information providing server system as claimed in claim 16, wherein the capacity information includes display capacity information of the requesting device.

18. The information providing server system as claimed in claim 16, wherein the capacity information includes a model name of the requesting device.

19. The information providing server system as claimed in claim 16, wherein the requesting device is a cellular phone.

* * * * *